2,925,321

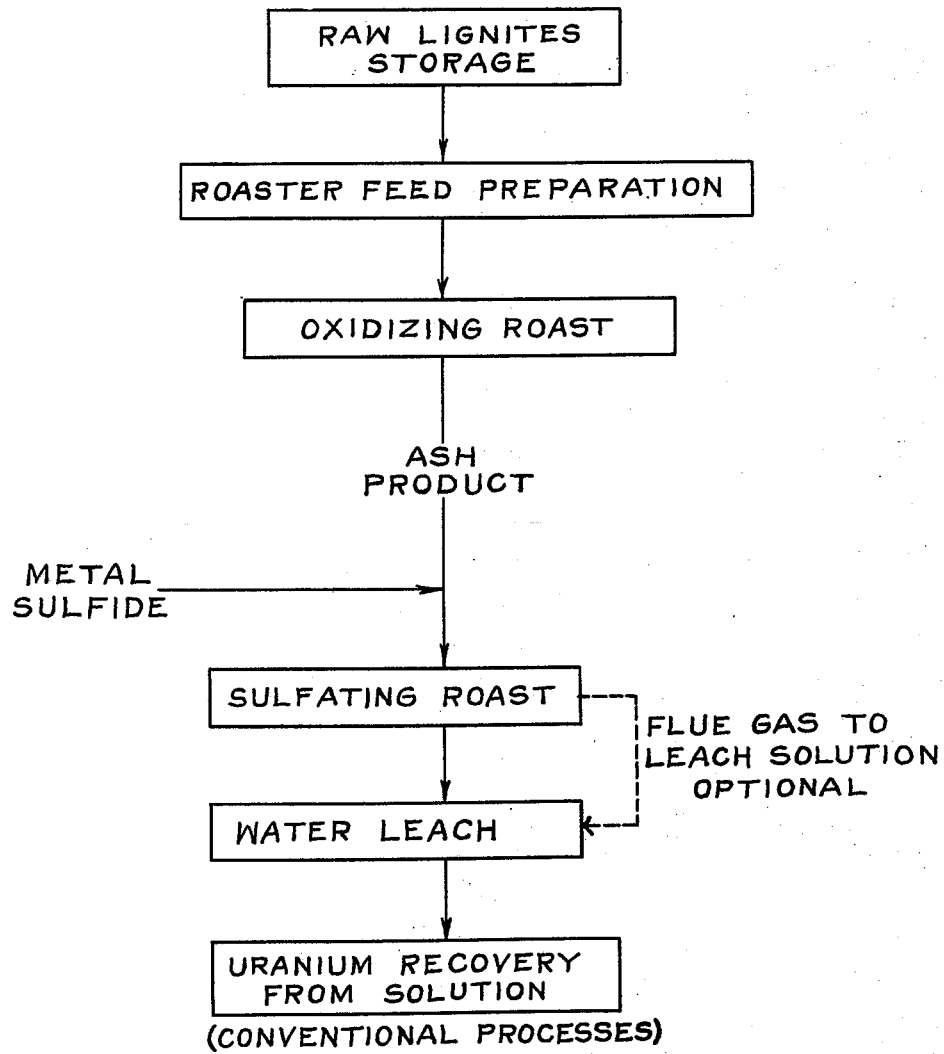

EXTRACTION OF URANIUM FROM LIGNITE ORES

Burt C. Mariacher, Lakewood, Colo., assignor to International Resources Corporation, Custer, S. Dak., a corporation of South Dakota Application September 10, 1956, Serial No. 609,032

12 Claims. (Cl. 23—14.5)

This invention relates to the extraction of uranium from lignite ores. Uraniferous lignites, such as those occurring in the North Cave Hills area of North Dakota, are known to contain uranium, the average content of which is on the order of 0.225 percent $U_3O_8$.

Heretofore, it has been proposed to obtain uranium extraction from such ores by an acid leaching operation, but such procedures have required so much acid to be used per ton of ore treated that it is very expensive to utilize the treatments commercially. In addition, leaching with a strong concentration of acid requires special equipment to withstand the corrosive effect of the acid, resulting in a high cost plant and expensive maintenance procedures.

Accordingly it is an object of this invention to provide a simple, economical and efficient process for extraction of the uranium content of uraniferous lignites.

Another object of the invention is to provide a simple, economical and efficient process for utilizing a novel type of acid leaching in the treatment of uraniferous lignites.

A further object of the invention is to provide a simple, economical and efficient process for the recovery of the uranium content of uraniferous lignites in an aqueous leaching treatment.

The present invention is based on the discovery that when uraniferous lignites are first roasted to drive off volatiles and substantially eliminate the carbon content by oxidation, followed by a sulfating roast, the uranium content is converted into water-soluble compositions that are readily extracted by leaching with water or very dilute sulfuric acid solution.

The practice of the invention will be best understood by reference to the accompanying flow sheet depicting a typical plant circuit. As shown, mine run lignite is subjected to a roaster feed preparation, which will include crushing to suitable size for the requirements of the roaster being used in the treatment. The ore may be air dried prior to crushing and frequently blending operations will be employed before the feed is ready for the roaster.

On completion of the feed preparation the crushed lignite is passed to an oxidizing roast where it is subjected to temperatures within the range of 400 degrees to 900 degrees C., until substantially all carbon has been oxidized. By-product recovery of flue gas may be employed if desired. The final product of this roast is essentially ash in which the uranium content remains.

The uranium-containing ash is then mixed with a sulfating agent, preferably a quantity of pyrite ($FeS_2$) or other suitable metal sulfide such as pyrrhotite, copper sulfides or zinc blend, et cetera. Preferably this is accompanied by a blending action after which the blended mixture is taken as the charge to a furnace, which preferably is maintained at a temperature approximating 400 degrees to 650 degrees C. Flue gas from this roasting may be collected and used to acidify the leach solution of the treatment.

On completion of the sulfating roast the residue may be introduced into a water bath and pulped. The solution may be fresh water, the aforementioned acidified aqueous solution, or a dilute sulfuric acid. Preferably the pulping will be on the order of 1 part solids to 3 parts solution, and the reaction allowed to continue until leaching is substantially complete. Following this, the enriched solution is separated from the solids as by filtering, and may be treated by any of the conventional processes employing precipitation, ion exchange or solvent extraction for final uranium recovery.

In order to illustrate the efficiency of this process certain typical test operations will be cited. In the first of these a lignite ore from South Dakota was air-dried and crushed to −10 mesh size. A sample was then oven-dried at 110 degrees C. for eighteen hours and split to obtain 1000 grams for test feed. This charge was introduced into an electric furnace maintained at 425 degrees C. and rabbled at ten minute intervals until practically all the carbon had been oxidized. An excess of air was present during the roast and retention time was two hours. The residual ash was weighed and found to be equal to 40.7 percent of the weight of the lignite charge to roasting.

Next, the ash was mixed with −10 mesh pyrite in the proportion of 300 pounds pyrite per ton of lignite and returned to the furnace for the sulfating roast. The furnace temperature was maintained at 500 degrees C., and the furnace remained closed with the air vents set to regulate the amount of available oxygen in the furnace. Roasting time was one hour and the charge was not rabbled. The final roasted product was analyzed and the $U_3O_8$ content was 0.990 percent.

The roasted product was then pulped to 25 percent solids with distilled water and agitated in an enclosed reaction flask for twenty-four hours with the pulp temperature maintained at 90 degrees C. The pulp was then filtered and the solution analyzed. It was found to contain 2.972 grams per litre $U_3O_8$ with a uranium extraction of 90.0 percent. Comparative testing demonstrated that it would require 313 pounds of sulfuric acid per ton of lignite with the sulfating roast omitted to obtain equivalent extraction.

Another test involved the same procedure through the first roasting stage. The ash was mixed with −10 mesh pyrite in the proportion of 100 pounds pyrite per ton of lignite and roasted for one hour with temperature maintained at 500 degrees C. The leaching feed in this test contained 1.024 percent of $U_3O_8$.

Leaching was performed by sulfuric acid introduction in the proportion of 49 pounds per ton of lignite and produced a pH of 2.0 as compared with a pH of 2.7 obtained in the first example with the water pulp. On analysis, the final residue was found to have 0.132 percent $U_3O_8$ and the uranium extraction was 88.4 percent. Comparative testing established that an equivalent $U_3O_8$ extraction is obtained when the sulfating roast is not used, by leaching with 262 pounds of sulfuric acid per ton of lignite.

From the foregoing it will be apparent that by employing a sulfating roast it is possible to leach the sulfated roast product in a pulp having a lower acid concentration, thereby eliminating or minimizing many of the problems of standard acid leaching operations, particularly as to initial plant and maintenance expense. The required extraction can be obtained by a marked reduction in acid consumption and in many instances a highly satisfactory extraction can be attained with a water leach.

The economy of the sulfating process is influenced to a large degree by the availability of the sulfating mineral and sulfuric acid. In general, pyrite is cheaper than the acid, it contains a higher percentage of sulfur, and the waste sulfur gases from roasting can be recovered and utilized to acidify the leaching solution.

If desired, the barren solution of the precipitation stage may be recycled instead of wasted, with only so much new water introduced as to make up moisture losses of a preceding cycle. Since the material taken for treatment provides its own fuel for the roasting stages, it is possible to treat a relatively low value ore utilizing the economies of this operation and produce enough high value product to make the operation profitable.

While I prefer to employ a two-stage roasting procedure with an intermediate mixing and blending stage at which the sulfating agent is introduced, it is within contemplation of this invention to have an integrated roasting operation in which the carbon is first removed, the sulfating agent is then introduced, and roasting proceeds throughout the extent of such treatment.

In the specification, the term "sulfating composition" has been used to designate the various types of agents that may be employed to react with the uranium content and convert it into the sulfate form which will dissolve in an aqueous solution.

In the preceding description I have specified preferred temperature ranges at the various stages. It should be understood that there is no critical temperature for the roasting or for the leaching stages, but best results will be obtained by maintaining the temperatures within the ranges previously specified.

In the pulping stage prior to leaching any suitable aqueous solution may be employed. In one of the test operations distilled water was used, but this was done merely for accuracy in analytical work and any available water supply that is not highly alkaline may be used directly in the treatment.

Changes and modifications may be availed of within the scope of the invention as defined in the hereunto appended claims.

I claim:

1. The process of treating lignite ores having a uranium content, which comprises roasting such a lignite ore in crushed condition until the volatile content is driven off and most of the carbon content is oxidized, adding to the ash residue of said roast a quantity of a sulfating composition selected from the class consisting of sulfides of iron, zinc and copper, subjecting such mixture to a second roasting action so as to convert the contained uranium to a water soluble condition, and leaching the ash residue of said roast in water for recovery of uranium.

2. A process as defined in claim 1, in which flue gas from the sulfating roast is recovered and introduced into the leaching solution.

3. A process as defined in claim 1, in which the pH of the leaching solution is above 2.0 and lower than 3.0.

4. The process of treating lignite ores having a uranium content, which comprises roasting such a lignite ore in crushed condition until the volatile content is driven off and most of the carbon content is oxidized, adding to the ash residue of said roast a quantity of pyrite, subjecting such mixture to a second roasting action so as to convert the contained uranium to a water soluble condition, and leaching the ash residue of said roast in water for recovery of uranium.

5. A process as defined in claim 4, in which the pyrite is fed at the rate of from 100 to 300 pounds per ton of lignite taken for treatment.

6. The process of treating lignite ores having a uranium content, which comprises roasting such a lignite ore in crushed condition until the volatile content is driven off and most of the carbon content is oxidized, adding to the ash residue of said roast a quantity of pyrrhotite, subjecting such mixture to a second roasting action so as to convert the contained uranium to a water soluble condition, and leaching the ash residue of said roast in water for recovery of uranium.

7. The process of treating lignite ores having a uranium content, which comprises roasting such a lignite ore in crushed condition until the volatile content is driven off and most of the carbon content is oxidized, adding to the ash residue of said roast a quantity of copper sulfide, subjecting such mixture to a second roasting action so as to convert the contained uranium to a water soluble condition, and leaching the ash residue of said roast in water for recovery of uranium.

8. The process of treating lignite ores having a uranium content, which comprises roasting such a lignite ore in crushed condition until the volatile content is driven off and most of the carbon content is oxidized, adding to the ash residue of said roast a quantity of zinc blende, subjecting such mixture to a second roasting action so as to convert the contained uranium to a water soluble condition, and leaching the ash residue of said roast in water for recovery of uranium.

9. The process of treating lignite ores having a uranium content, which comprises roasting such a lignite ore in crushed condition until the volatile content is driven off and most of the carbon content is oxidized, adding to the ash residue of said roast a quantity of a sulfating composition selected from the class consisting of sulfides of iron, zinc and copper, subjecting such mixture to a second roasting action so as to convert the contained uranium to a water soluble condition, and leaching the ash residue of said roast in a dilute mineral acid for recovery of uranium.

10. A process as defined in claim 9, in which the mineral acid is sulfuric acid.

11. The process of treating lignite ores having a uranium content, which comprises drying crushed lignite ore, roasting the dried ore at a temperature of approximately 425° C. in the presence of air for approximately two hours, mixing the ash residue of said roasting with pyrite of approximately —10 mesh size, roasting said mixture at approximately 500° C. for about one hour, pulping the roasted product to about 25% solids in water, and leaching said solids in said solvent until most of the uranium has gone into solution.

12. The process as defined in claim 11, in which the pH of the leaching solution is approximately 2.0.

References Cited in the file of this patent

UNITED STATES PATENTS 1,429,550    Vogt _____ Sept. 19, 1922

FOREIGN PATENTS 493,787    Canada _____ June 23, 1953

OTHER REFERENCES

AEC Document BMI-JDS-195, by Richardson et al., 111 pages, June 30, 1949. (Copy available from the Office of Technical Services, Dept. of Commerce, Washington 25, D.C.)

AEC Document BMI-237, pp. 9, 26-31, 40, July 31, 1950. Date declassified Apr. 11, 1956.